United States Patent
Smith et al.

(10) Patent No.: US 7,694,584 B2
(45) Date of Patent: Apr. 13, 2010

(54) CORIOLIS FLOW METER AND METHOD FOR DETERMINING A SIGNAL DIFFERENCE IN CABLING AND FIRST AND SECOND PICKOFF SENSORS

(75) Inventors: Brian T. Smith, Johnstown, CO (US); Craig B. McAnally, Thornton, CO (US)

(73) Assignee: Micro Motion, Inc., Boulder, CO (US)

(*) Notice: Subject to any disclaimer, the term of this patent is extended or adjusted under 35 U.S.C. 154(b) by 688 days.

(21) Appl. No.: 11/570,354

(22) PCT Filed: Jun. 14, 2004

(86) PCT No.: PCT/US2004/019160

§ 371 (c)(1),
(2), (4) Date: Dec. 11, 2006

(87) PCT Pub. No.: WO2006/001805

PCT Pub. Date: Jan. 5, 2006

(65) Prior Publication Data

US 2007/0186683 A1    Aug. 16, 2007

(51) Int. Cl.
*G01F 1/84* (2006.01)
(52) U.S. Cl. ................................. 73/861.354
(58) Field of Classification Search ............ 73/861.356, 73/861.354; 324/654, 200, 546, 76.75
See application file for complete search history.

(56) References Cited

U.S. PATENT DOCUMENTS

| 4,655,089 A | 4/1987 | Kappelt et al. |
| 5,050,439 A | 9/1991 | Thompson |
| 6,449,574 B1 | 9/2002 | Eryurek et al. |
| 2009/0049928 A1* | 2/2009 | Hays et al. ............. 73/861.356 |

FOREIGN PATENT DOCUMENTS

| DE | 19732605 A1 | 2/1999 |
| EP | 1229309 A | 8/2002 |
| RU | 2119149 C1 | 9/1998 |
| RU | 2159410 C2 | 11/2000 |
| WO | WO-93/21505 A1 | 10/1993 |

* cited by examiner

*Primary Examiner*—Jewel Thompson
(74) *Attorney, Agent, or Firm*—The Ollila Law Group LLC

(57) ABSTRACT

A Coriolis flow meter includes first and second pickoff sensors, cabling coupled to the first and second pickoff sensors, and a signal injection device coupled to the cabling. The signal injection device is configured to generate one or more reference signals, with the one or more reference signals being substantially identical in phase, and communicate the one or more reference signals into the cabling and the first and second pickoff sensors. The Coriolis flow meter further includes a signal conditioning circuit coupled to the cabling. The signal conditioning circuit is configured to receive first and second response signals from the cabling and the first and second pickoff sensors in response to the one or more reference signals and determine a signal difference between first and second response signals.

26 Claims, 5 Drawing Sheets

CORIOLIS FLOW METER AND METHOD FOR DETERMINING A SIGNAL DIFFERENCE IN CABLING AND FIRST AND SECOND PICKOFF SENSORS

BACKGROUND OF THE INVENTION

1. Field of the Invention

The present invention relates to a Coriolis flow meter and method for determining a signal difference in cabling and first and second pickoff sensors.

2. Statement of the Problem

Vibrating conduit sensors, such as Coriolis mass flow meters, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as two independent pairs of wires. The instrumentation receives signals from the two pickoff sensors and processes the signals in order to derive a mass flow rate measurement.

When the flow conduit or conduits of a Coriolis flow meter are empty, then the phase difference between the two pickoff signals is ideally zero. In contrast, during normal operation, the flow through the flow meter induces a phase shift between the two pick off signals due to the Coriolis effect. The phase shift is directly proportional to the material flow through the conduits. Therefore, by making an accurate measurement of the signal difference, the flow meter can accurately measure the mass flow rate.

Determining the signal difference between signals from the pickoff sensors is an important operation of the flow meter instrumentation. This signal determination must be accurately performed even though the cabling between the sensors and the instrumentation affects the measurement signals. All cabling includes inherent and distributed inductance, capacitance, and resistance characteristics. In addition, the pickoff sensors can have inherent characteristics that further affect the signal difference. Each pickoff signal must travel through the cabling and therefore the accuracy of the signal can be reduced before the signal reaches the measuring instrumentation of the flow meter.

Typical flow meter cabling can vary in length according to the environment and installation. A meter cabling can extend up to 1,000 feet. The distributed cable parameters, such as the inherent inductance, capacitance, and resistance, will introduce some signal difference onto a sinusoidal signal traveling through the cabling. As a result, at the end of the cable, two independent measurement signals traveling through the cable can experience a signal difference introduced by the cable if the signals do not experience the exact same cable parameters. Since the measuring instrumentation relates signal difference to mass flow, the cabling and sensor system adds an unwanted error term to the flow measurement.

In addition to mismatch between the two cable pairs, the distributed cabling and sensor system parameters will vary with temperature. This temperature variation can require a zeroing operation, such as when a flow meter is installed or when the ambient temperature changes by more that a certain amount. During a zeroing operation (i.e., under no-flow conditions), the instrumentation captures the signal difference generated by the system (including pickoff mismatch, cabling mismatch, instrumentation mismatch) and subtracts this offset from all subsequent phase measurements. However, a one-time zeroing does not guarantee proper operation, as the cabling/sensor system characteristics can and will change over time.

Prior art flow meters do not autonomously and continuously compensate for signal differences due to the inherent characteristics of cabling and pickoff sensors. Prior art flow meters do not perform compensation outside of the meter electronics.

SUMMARY OF THE SOLUTION

The present invention helps solve the problems associated with inherent characteristics of cabling and pickoff sensors of a flow meter.

A Coriolis flow meter is provided according to an embodiment of the invention. The Coriolis flow meter comprises first and second pickoff sensors, cabling coupled to the first and second pickoff sensors, and a signal injection device coupled to the cabling. The signal injection device is configured to generate one or more reference signals, with the one or more reference signals being substantially identical in phase. The signal injection device is further configured to communicate the one or more reference signals into the cabling and the first and second pickoff sensors. The Coriolis flow meter further comprises a signal conditioning circuit coupled to the cabling. The signal conditioning circuit is further configured to receive first and second response signals from the cabling and the first and second pickoff sensors in response to the one or more reference signals and determine a signal difference between first and second response signals.

A method for determining a signal difference in cabling and first and second pickoff sensors of a Coriolis flowmeter is provided according to an embodiment of the invention. The method comprises generating one or more reference signals, wherein the one or more reference signals are substantially identical in phase, communicating the one or more reference signals into the cabling and the first and second pickoff sensors, and determining the signal difference between first and second response signals returned from the cabling and the first and second pickoff sensors in response to the one or more reference signals.

ASPECTS

In one aspect, the signal injection device comprises a digital-to-analog (D/A) converter configured to receive a digital frequency command and output a frequency input, a reference signal generator that receives the frequency input from the D/A converter and outputs a single reference signal of a frequency specified by the frequency input, and a transformer that converts the single reference signal into the one or more reference signals.

In another aspect, the transformer comprises a ferrous core transformer.

In yet another aspect, the transformer comprises primary windings and first and second secondary windings, with a windings ratio of the primary windings to the first and second secondary windings comprising a substantially 7:1:1 windings ratio.

In yet another aspect, the D/A converter receives the digital frequency command from the signal conditioning circuit.

In yet another aspect, the one or more reference signals are substantially identical in phase and in amplitude.

In yet another aspect, the signal difference is substantially removed from first and second measurement signals by the signal conditioning circuit, with the first and second measurement signals being generated by the first and second pickoff sensors in response to flow conduit vibration.

In yet another aspect, the signal conditioning circuit is further configured to perform compensation for the cabling and the first and second pickoff sensors using the signal difference.

In yet another aspect, the signal conditioning circuit is further configured to periodically perform compensation for the cabling and the first and second pickoff sensors using the signal difference.

In yet another aspect, the first and second response signals are different in frequency from first and second measurement signals, with the first and second measurement signals being generated by the first and second pickoff sensors in response to flow conduit vibration.

In yet another aspect, the first and second response signals are substantially identical in frequency to first and second measurement signals, with the first and second measurement signals being generated by the first and second pickoff sensors in response to flow conduit vibration.

In yet another aspect, the signal conditioning circuit is further configured to use the first and second response signals to detect an open circuit in the cabling and in the first and second pickoff sensors.

In yet another aspect, the signal conditioning circuit is further configured to use the first and second response signals to detect a short circuit in the cabling and in the first and second pickoff sensors.

In yet another aspect, the signal conditioning circuit is further configured to use the first and second response signals to perform an automatic gain adjustment.

In yet another aspect, the signal conditioning circuit receives one or more reference signals along with the first and second response signals and wherein the signal conditioning circuit is further configured to remove the one or more reference signals.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
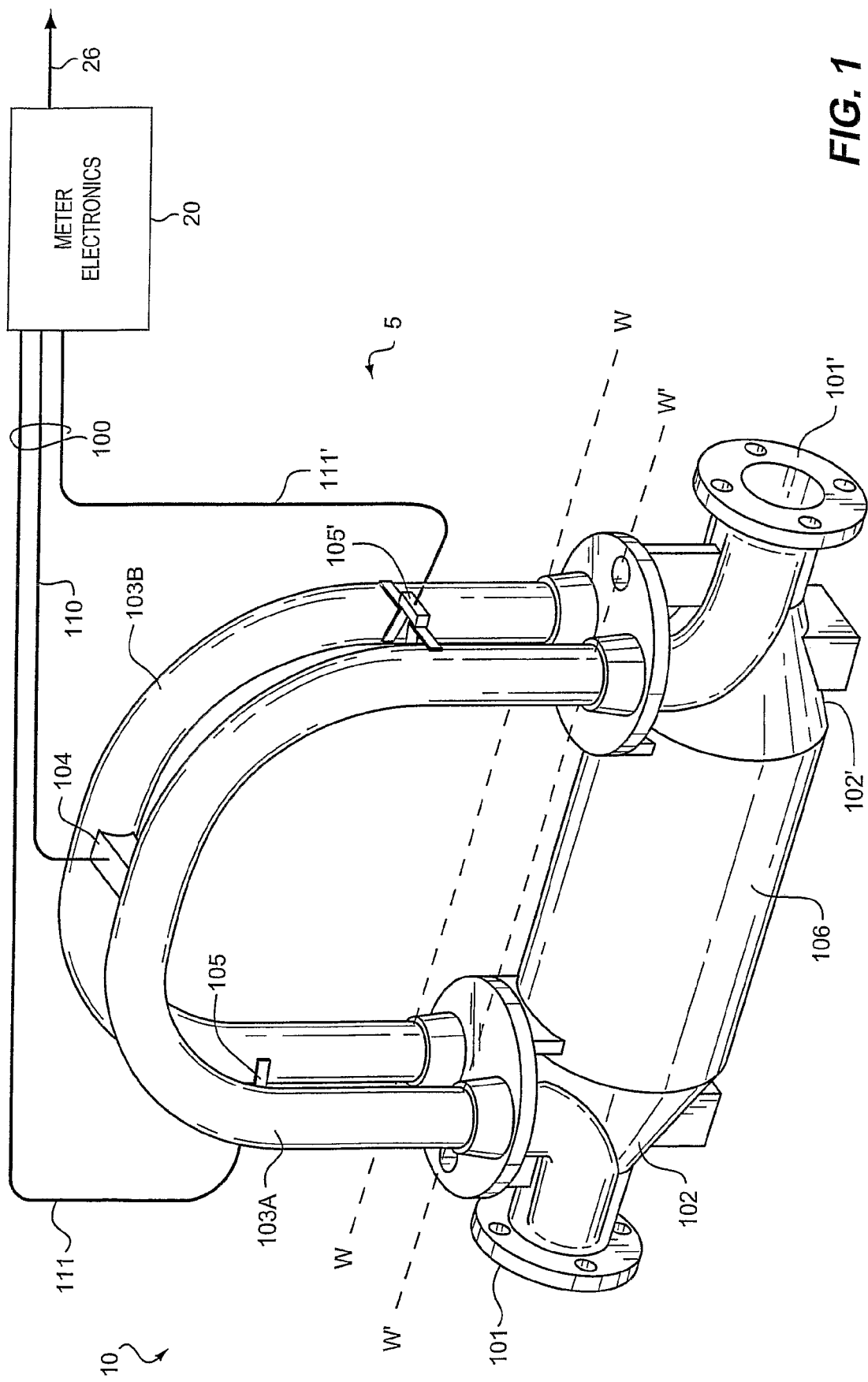
FIG. 1 illustrates a Coriolis flow meter comprising a flow meter assembly and meter electronics.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flow meter regardless of the number of drivers, pick-off sensors, flow conduits, or the operating mode of vibration.

Flow meter assembly 10 includes a pair of flanges 101 and 101', manifolds 102 and 102', driver 104, pick-off sensors 105-105', and flow conduits 103A and 103B. Driver 104 and pick-off sensors 105 and 105' are connected to flow conduits 103A and 103B.

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow conduits 103A and 103B. When flow meter assembly 10 is inserted into a pipeline system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W—W and W'—W' respectively. The flow conduits extend outwardly from the manifolds in an essentially parallel fashion.

Flow conduits 103A-B are driven by driver 104 in opposite directions about their respective bending axes W and W' and at what is termed the first out of bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104.

Meter electronics 20 receives sensor signals on leads 111 and 111', respectively. Meter electronics 20 produces a drive signal on lead 110 which causes driver 104 to oscillate flow conduits 103A and 103B. Meter electronics 20 processes left and right velocity signals from pick-off sensors 105 and 105' in order to compute a mass flow rate. Path 26 provides an input and an output means that allows meter electronics 20 to interface with an operator. The description of FIG. 1 is provided merely as an example of the operation of a Coriolis flow meter and is not intended to limit the teaching of the present invention.

Figure 2:
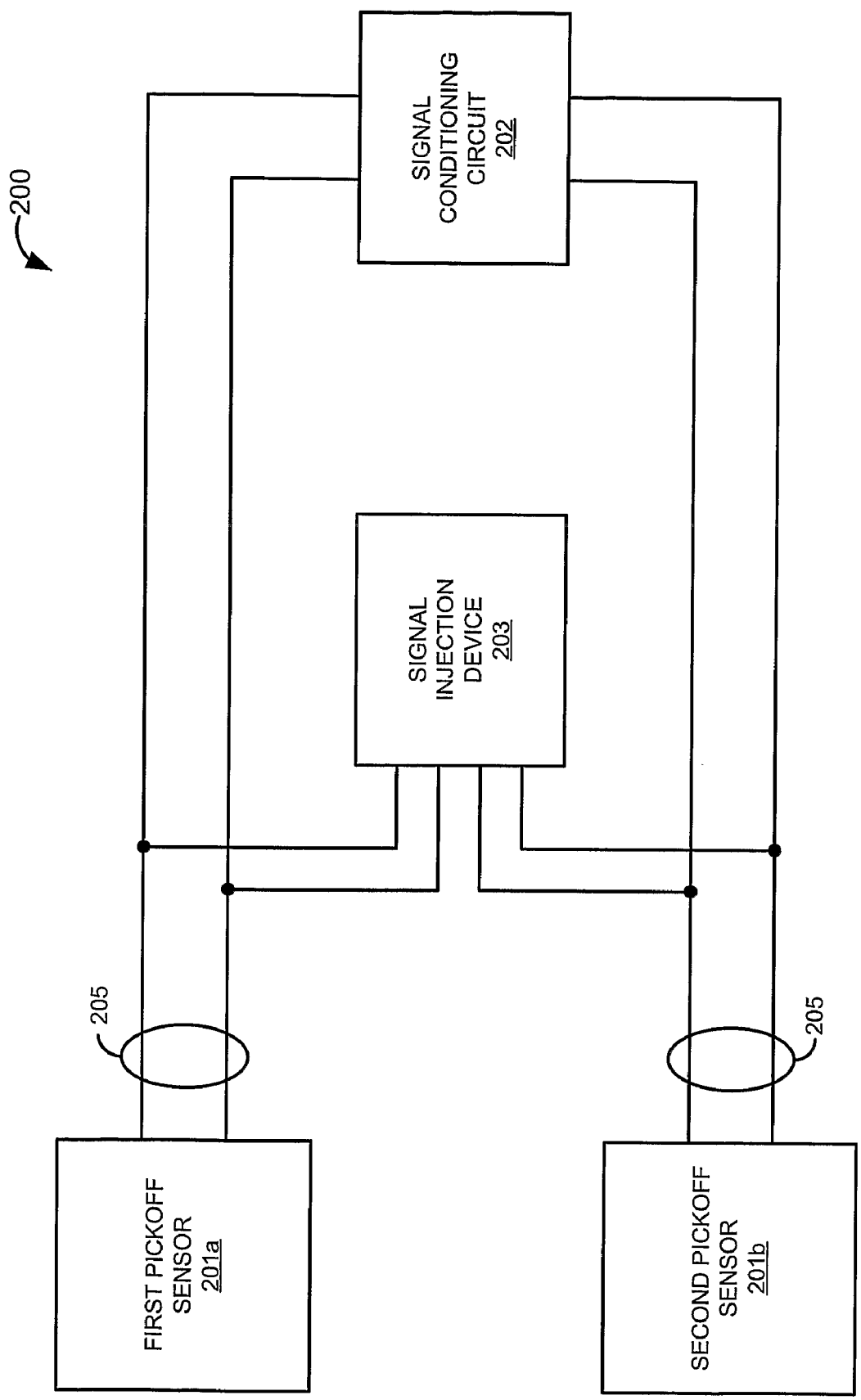
FIG. 2 is a diagram of a Coriolis flow meter according to an embodiment of the invention.

FIG. 2 is a diagram of a Coriolis flow meter 200 according to an embodiment of the invention. The flow meter 200 includes a first pickoff sensor 201a, a second pickoff sensor 201b, a signal conditioning circuit 202, and a signal injection device 203. The signal conditioning circuit 202 is coupled to the first and second pickoff sensors 201a and 201b by cabling 205. In addition, the signal injection device 203 is also coupled to the cabling 205. In one embodiment, the signal injection device 203 and the signal conditioning circuit 202 comprise components of the meter electronics 20 (see FIG. 1).

The first and second pickoff sensors 201a and 201b are coupled to the signal conditioning circuit 202 by cabling 205. The cabling 205 can comprise any manner of wires, cables, fibers, etc., that electrically connect the first and second pickoff sensors 201a and 201b to the signal conditioning circuit 202. The cabling 205 in one embodiment comprises the leads 100 of FIG. 1. Consequently, the signal conditioning circuit 202 receives first and second measurement signals from the first and second pickoff sensors 201a and 201b via the cabling 205 in response to vibration of a flow conduit or flow conduits of the flow meter 5.

The signal injection device 203 generates first and second reference signals. The first and second reference signals are substantially identical in phase. Alternatively, the first and second reference signals can be substantially identical in both phase and amplitude. It should be understood that the signal injection device 203 can create one reference signal, where the one reference signal is communicated to both the first and second pickoff sensors 201a and 201b, such as by the signal injection device 203 of FIG. 4. The signal injection device 203 further communicates the first and second reference signals into the cabling 205 and the first and second pickoff sensors 201a and 201b. The signal injection device 203 therefore can communicate first and second reference signals into the cabling 205 and into the first and second pickoff sensors 201a and 201b. Consequently, first and second response signals are created by the first and second pickoff sensors 201a and 201b in response to the reference signals. The response signals comprise reflections of the reference signals, but wherein the response signals may exhibit a signal difference between the first and second response signals due to any inherent characteristics of the cabling 205 and the pickoff sensors 201. The signal difference can comprise a phase difference, a time delay, a Coriolis-induced pickoff difference, etc. The inherent characteristics can include, for example, distributed inductance, capacitance, and resistance characteristics of the cabling 205 and the pickoff sensors 201. This signal difference can be received, detected, and measured by the signal conditioning circuit 202. It should be understood that the signal difference can comprise any value, including zero, if the sensor system is perfectly in balance. The signal difference generated by the cabling 205 and the pickoff sensors 201 can therefore be determined and measured.

The signal conditioning circuit 202 processes the first and second measurement signals in order to generate mass flow rate measurements. In addition, the signal conditioning circuit 202 determines the signal difference between the first and second response signals that are returned from the cabling 205 and the first and second pickoff sensors 201a and 201b in response to the first and second reference signals. The signal conditioning circuit 202 can remove first and second reference signals from the first and second response signals in order to subsequently process the first and second response signals. The signal conditioning circuit 202 in one embodiment filters the first and second reference signals from the first and second response signals, such as by using digital filters, for example. Removal of the reference signal is discussed in more detail in conjunction with FIG. 5 and the accompanying text.

The signal difference in one embodiment is used for performing compensation for the flow meter 5. The signal difference can be subtracted out or otherwise removed from the measurement signals in the signal conditioning circuit 202. In this manner, the flow meter 5 can zero out effects on the flow meter 5 created by the type of cabling and sensors, the length of cabling, temperature effects on the cabling and sensors, can detect breaks and/or manufacturing flaws in the cabling and sensors, etc.

Because the injected reference signals have a zero phase difference between them, any signal difference measured by the signal conditioning circuit 202 is due to mismatches between the two signal paths, including temperature induced effects. Since the compensation signal is injected onto the wiring, any cable induced shifts are also measured. Therefore, the signal conditioning circuit 202 can adjust the actual pickoff sensor measurement by any signal differences measured in the system compensation signal. The end result is a system compensated flow measurement, including a phase compensated flow measurement.

In one embodiment, the signal difference is subtracted from the measurement signals. In another embodiment, the signal difference value comprises a multiplier or ratio. Consequently, the measurement signals can be multiplied by the signal difference multiplier or signal difference ratio in order to perform the compensation. It should be understood that other compensation methods can be employed and are within the scope of the description and claims.

It should be understood that the first and second reference signals can comprise a higher or lower frequency than the measurement signals (the measurement signal frequency is dependent on the vibration frequency of the flow conduit or conduits and the response of the flow meter 5 to the material flow). Alternatively, the first and second reference signals can comprise a same frequency as the measurement signals.

The first and second reference signals can be essentially continuously generated and the signal conditioning circuit 202 therefore can be essentially continuously receiving the response signals and performing compensation. Alternatively, the first and second reference signals can be periodically generated and used to perform compensation at predetermined time intervals.

The signal conditioning circuit 202 can include a processor (not shown) and a signal difference determination and compensation software routine. Consequently, the processor can execute the routine, can control generation of the first and second reference signals, can receive the first and second response signals, and can determine the signal difference between the first and second response signals. Alternatively, the signal conditioning circuit 202 can include equivalent circuitry and/or specialized circuit components that perform the above operations.

Figure 3:
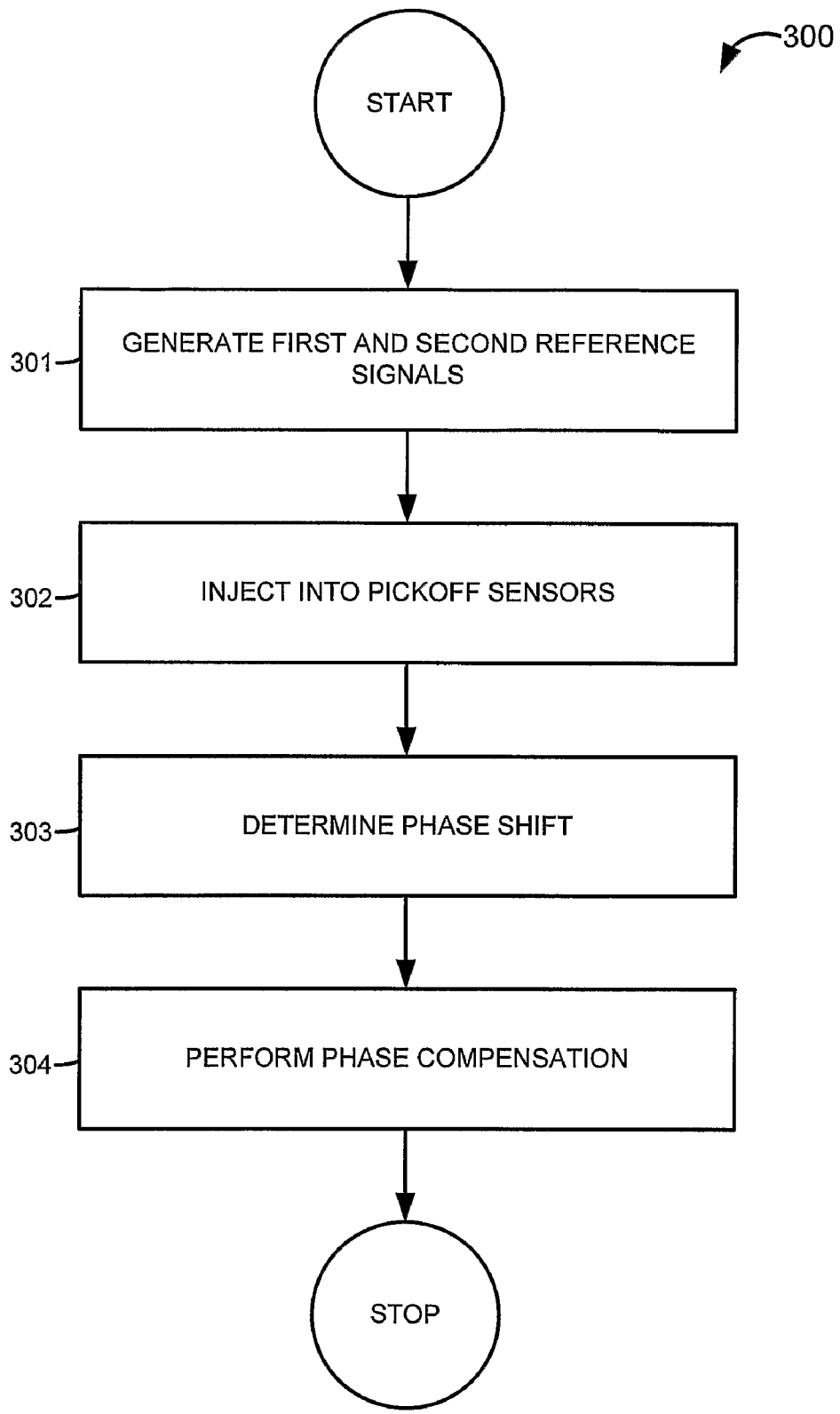
FIG. 3 is a flowchart of a method for determining a signal difference in cabling and first and second pickoff sensors of the Coriolis flow meter according to an embodiment of the invention.

FIG. 3 is a flowchart 300 of a method for determining a signal difference in the cabling 205 and the first and second pickoff sensors 201a and 201b according to an embodiment of the invention. In step 301, the signal injection device 203 generates the first and second reference signals. The first and second reference signals are substantially identical in phase. The first and second reference signals in one embodiment are substantially identical in phase and in amplitude. However, it should be understood that the amplitudes of the first and second reference signals do not have to match.

In step 302, the first and second reference signals are injected into the cabling 205 and the first and second pickoff sensors 201a and 201b by the signal injection device 203. The injected first and second reference signals will generate first and second response signals. The first and second response signals can be received by the signal conditioning circuit 202.

In step 303, a signal difference is determined in the first and second response signals. The signal difference determination can be performed by the signal conditioning circuit 202, for example. The signal difference can be an effect of sensor system characteristics, such as the inductance, capacitance, and resistance present in the cabling 205 and in the first and second pickoff sensors 201a and 201b, for example. The signal difference can comprise a phase difference, a time delay, a Coriolis-induced pickoff difference, etc.

In step 304, compensation is performed, using the determined signal difference. The compensation can be performed by the signal conditioning circuit 202, for example. The compensation can be performed in order to substantially remove the signal difference due to the cabling 205 and the first and second pickoff sensors 201a and 201b. The compensation can comprise phase compensation, for example.

In addition, the reference signal injection can also be used for other purposes. In one embodiment, the first and second response signals can be used to perform automatic gain adjustment in the flow meter 5. Consequently, the first and second response signals can be used to determine the amplitudes of the first and second reference signals, in order to generate first and second reference signals of substantially the same amplitude.

In one embodiment, the first and second response signals can be used to detect open and/or short circuit conditions in the pickoff sensors 201. In this embodiment, if a first or second response signal is not received, the signal conditioning circuit 202 can determine that the corresponding pickoff sensor and/or cabling portion is short circuited. Alternatively, if a first or second response signal is immediately and substantially completely reflected, the signal conditioning circuit 202 can determine that the corresponding pickoff sensor and/or cabling portion comprises an open circuit. In either case, the signal conditioning circuit 202 can determine an error condition and take an appropriate action, such as generating an alarm or transmitting an error message, for example. In addition, the signal conditioning circuit 202 can optionally measure reflection timing and determine a length of the cabling 205. Furthermore, the signal conditioning circuit 202 can optionally determine the location of a break or fault in the cabling 205 by determining a reflection distance that is less than the length of the cabling 205. Furthermore, the first and second response signals can be used to detect customer mis-wiring or mis-installation of the flow meter 5.

In one embodiment, the first and second response signals can be used to detect electronics errors. For example, the first and second response signals can be used to detect communication problems between the signal injection device 203 and the signal conditioning circuit 202.

Figure 4:
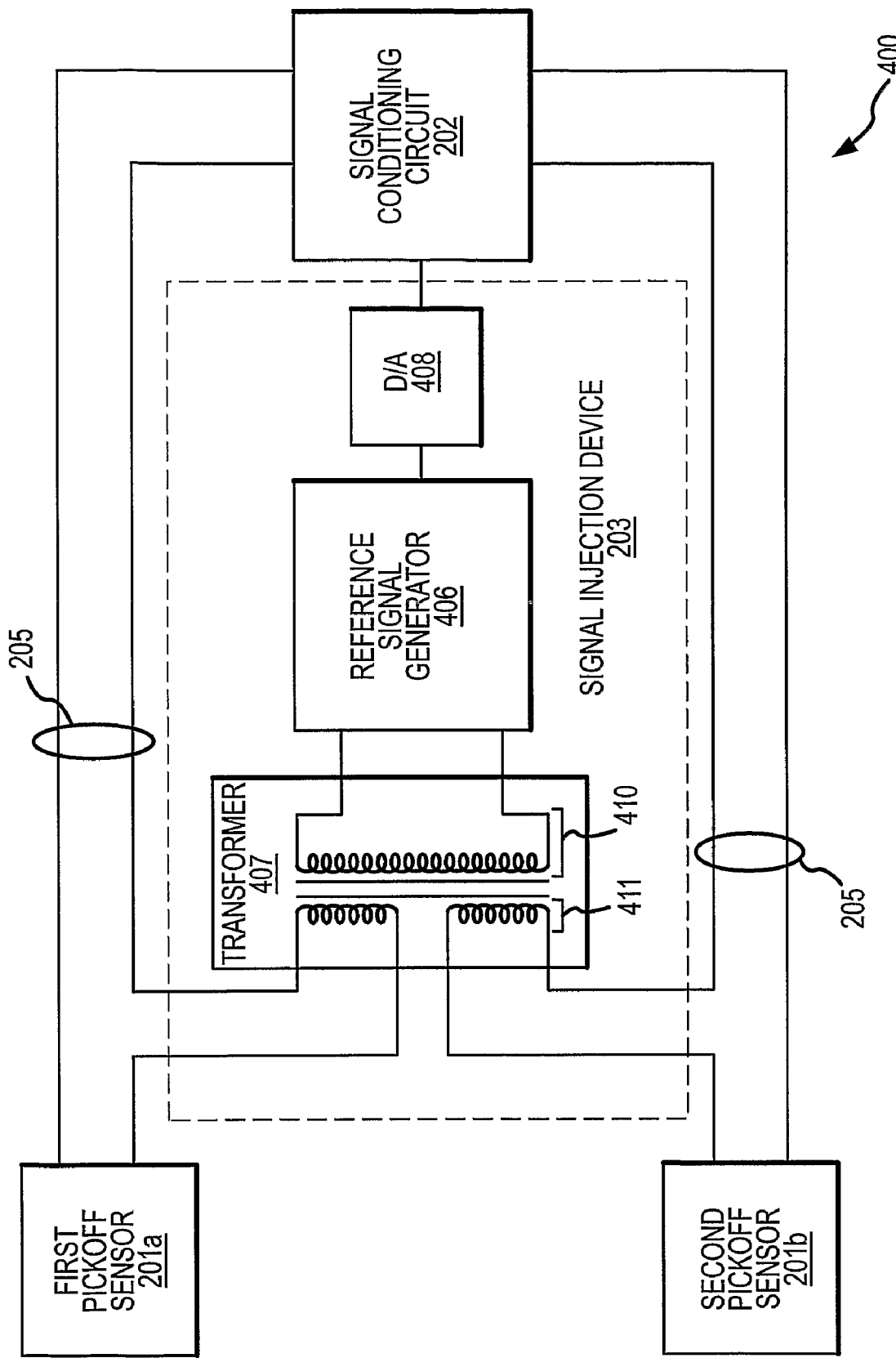
FIG. 4 illustrates a Coriolis flow meter according to another embodiment of the invention.

FIG. 4 illustrates a Coriolis flow meter 400 according to another embodiment of the invention. Components in common with FIG. 2 share the same reference numerals. The flow meter 400 includes the first pickoff sensor 201a, the second pickoff sensor 201b, and the signal conditioning circuit 202. In this embodiment, the signal injection device 203 comprises a digital-to-analog (D/A) converter 408, a reference signal generator 406, and a transformer 407. The D/A 408 is connected to the signal conditioning circuit 202 and to the reference signal generator 406. The reference signal generator 406 is further connected to the transformer 407.

The D/A 408 receives a digital frequency command from the signal conditioning circuit 202. The D/A 408 converts the digital frequency command into a frequency input into the reference signal generator 406, wherein the frequency input specifies the frequency of a (single) reference signal to be generated. The reference signal generator 406 generates the reference signal and transmits the reference signal to primary windings 410 of the transformer 407.

The transformer 407 creates the first and second reference signals through the use of a split transformer secondary, wherein the secondary windings 411 of the transformer 407 comprise substantially equal pairs of secondary windings. In this manner, the reference signal at the primary windings 410 of the transformer 407 is converted into the first and second reference signals at the secondary windings 411. The transformer 407 is preferably specifically constructed to provide accurate phase matching, over temperature, between the first and second secondary windings 411. The two secondary windings 411 are connected to the cabling 205 and to the first and second pickoff sensors 201a and 201b, wherein the first and second reference signals are injected into the pickoff sensors. As before, the signal conditioning circuit 202 receives the first and second response signals that are created as a result of the injection of the first and second reference signals. In one embodiment, a windings ratio of the primary windings to the first and second secondary windings comprises a substantially 7:1:1 windings ratio. As a result, in this embodiment the primary windings can comprise 140 turns while the first and second secondary windings can comprise 20 turns. It should be understood that other windings ratios can be employed, if desired. In one embodiment, the windings are constructed from #36 AWG wire.

In one embodiment, the transformer 407 comprises a ferrous core transformer 407. The ferrous core can comprise iron, a ferrite material, or any manner of iron alloy or iron compound. In one embodiment, the transformer includes a ferrite core of about 7 millimeters in diameter. However, it should be noted that any transformer configuration can be employed, and all transformer configurations and constructions are within the scope of the specification and claims.

In one embodiment, the primary windings are constructed to have an inductance of about 25 milliHenrys (mH), while the first and second secondary windings are constructed to have an inductance of about 500 microHenrys (µH). The inductance can be chosen to be relatively low if the flow meter 5 is intended for an "intrinsically safe" flow meter application. The transformer 407 can further be designed to have about 50 volts RMS (root mean square) isolation between the secondary windings, and about 100 volts RMS isolation between the primary windings and the secondary windings.

Figure 5:
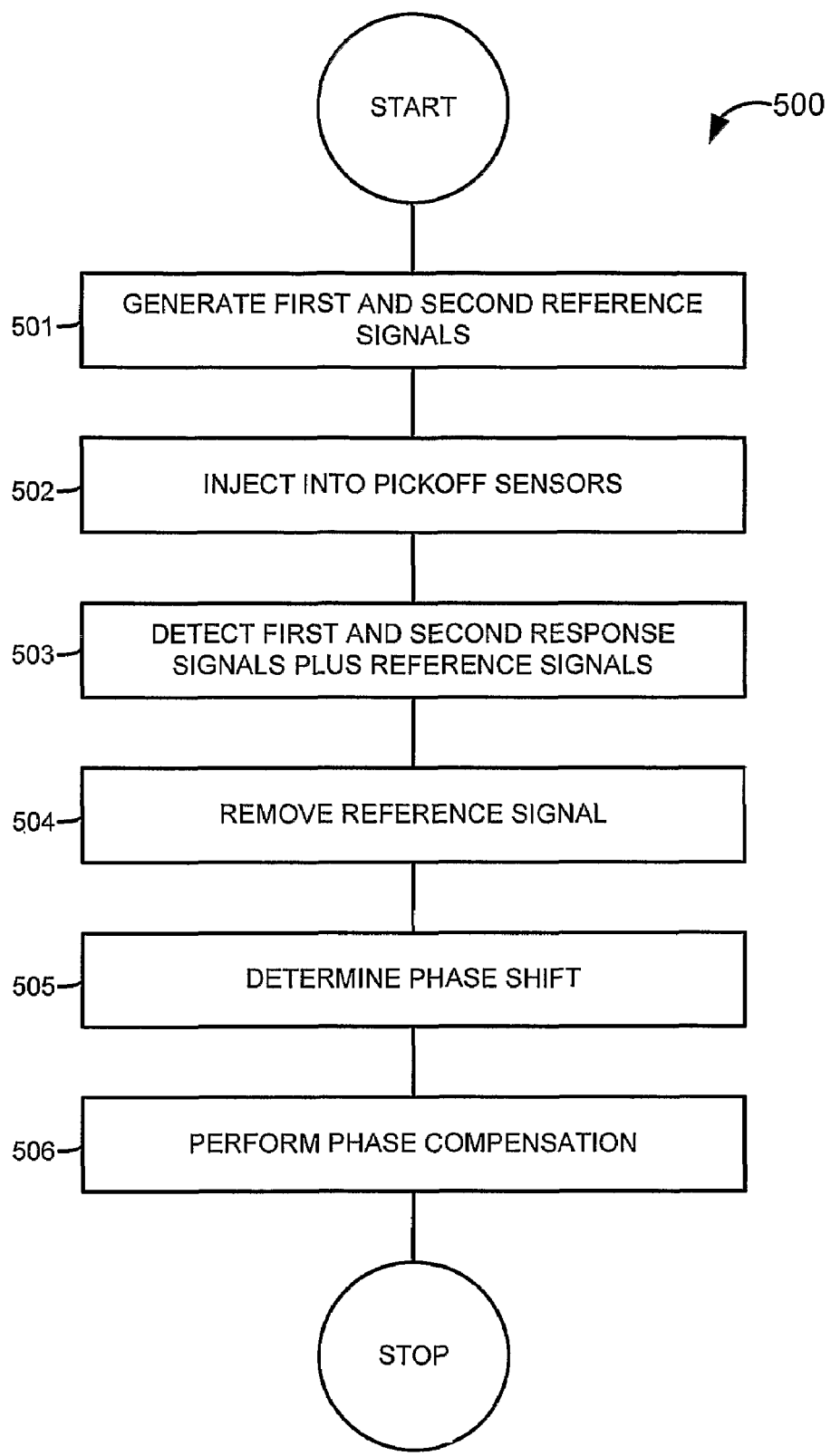
FIG. 5 is a flowchart of a method for determining a signal difference according to another embodiment of the invention.

FIG. 5 is a flowchart 500 of a method for determining a signal difference according to another embodiment of the invention. In step 501, the signal injection device 203 generates the first and second reference signals, as previously discussed.

In step 502, the first and second reference signals are injected into the cabling 205 and the first and second pickoff sensors 201a and 201b, as previously discussed.

In step 503, the first and second reference signals and the first and second response signals are detected by the signal conditioning circuit 202. It should be understood that the first and second reference signals are simultaneously injected into the pickoffs 105 and 105' and communicated to the signal conditioning circuit 202.

In step 504, the signal conditioning circuit 202 removes the first and second reference signals. The first and second reference signals are not needed by the signal conditioning circuit 202, and are only needed in order to generate the first and second response signals. The signal conditioning circuit 202 can filter out the first and second reference signals. The signal conditioning circuit 202 can use any manner of filter or filters to remove the first and second reference signals. In one embodiment, the signal conditioning circuit 202 uses digital filtering to remove the first and second reference signals. In one embodiment, the signal conditioning circuit 202 can include a specialized signal processor for this digital filtering, such as a Digital Signal Processor (DSP).

In step 505, a signal difference is determined in the first and second response signals, as previously discussed.

In step 506, compensation is performed, including phase compensation, as previously discussed.

The Coriolis flow meter and method according to the invention can be employed according to any of the embodiments in order to provide several advantages, if desired. The invention provides a flow meter that performs automatic and autonomous zeroing of the sensor system. The invention can autonomously zero out the varying characteristics of the cabling and the pickoff sensors. The invention can zero out effects on the flow meter created by the type of cabling and sensors, the length of cabling, temperatures effects on the cabling and sensors, manufacturing flaws in the cabling and sensors, etc. The invention can detect the characteristics of each individual meter and can perform detection and compensation for the particular flow meter. The invention can perform compensation as needed due to environmental changes, including phase compensation and time-varying compensation.

The invention can perform advanced system diagnostics. The invention can use a known reference signal applied to the pickoff sensors in order to perform automatic gain adjustment, to detect open and shorted conditions in the pickoff sensors and in the cabling, perform electronics error detection, and to detect customer or installation mis-wiring.

The invention can reduce overall flow meter system cost. The invention eliminates the need for expensive cabling having precise tolerances. The invention eliminates the need for precision passive components in the signal conditioning circuit. The invention can reduce cost of the flow meter by allowing the use of less expensive, lower tolerance components.

What is claimed is:

1. A Coriolis flow meter, comprising:
   first and second pickoff sensors;
   cabling coupled to the first and second pickoff sensors;
   a signal injection device coupled to the cabling, with the signal injection device being configured to generate one or more reference signals, with the one or more reference signals being substantially identical in phase, and with the signal injection device being further configured to communicate the one or more reference signals into the cabling and the first and second pickoff sensors; and
   a signal conditioning circuit coupled to the cabling, with the signal conditioning circuit being configured to receive first and second response signals from the cabling and the first and second pickoff sensors in response to the one or more reference signals and determine a signal difference between first and second response signals.

2. The Coriolis flow meter of claim 1 with the signal injection device comprising:
   a digital-to-analog (D/A) converter configured to receive a digital frequency command and output a frequency input;
   a reference signal generator that receives the frequency input from the D/A converter and outputs a single reference signal of a frequency specified by the frequency input; and
   a transformer that converts the single reference signal into the one or more reference signals.

3. The Coriolis flow meter of claim 2 wherein the transformer comprises a ferrous core transformer.

4. The Coriolis flow meter of claim 2 wherein the transformer comprises primary windings and first and second secondary windings, with a windings ratio of the primary windings to the first and second secondary windings comprising a substantially 7:1:1 windings ratio.

5. The Coriolis flow meter of claim 2 wherein the D/A converter receives the digital frequency command from the signal conditioning circuit.

6. The Coriolis flow meter of claim 1 wherein the one or more reference signals are substantially identical in phase and in amplitude.

7. The Coriolis flow meter of claim 1 wherein the signal difference is substantially removed from first and second measurement signals by the signal conditioning circuit, with the first and second measurement signals being generated by the first and second pickoff sensors in response to flow conduit vibration.

8. The Coriolis flow meter of claim 1 wherein the signal conditioning circuit is further configured to perform compensation for the cabling and the first and second pickoff sensors using the signal difference.

9. The Coriolis flow meter of claim 1 wherein the signal conditioning circuit is further configured to periodically perform compensation for the cabling and the first and second pickoff sensors using the signal difference.

10. The Coriolis flow meter of claim 1 wherein the first and second response signals are different in frequency from first and second measurement signals, with the first and second measurement signals being generated by the first and second pickoff sensors in response to flow conduit vibration.

11. The Coriolis flow meter of claim 1 wherein the first and second response signals are substantially identical in frequency to first and second measurement signals, with the first and second measurement signals being generated by the first and second pickoff sensors in response to flow conduit vibration.

12. The Coriolis flow meter of claim 1 wherein the signal conditioning circuit is further configured to use the first and second response signals to detect an open circuit in the cabling and in the first and second pickoff sensors.

13. The Coriolis flow meter of claim 1 wherein the signal conditioning circuit is further configured to use the first and second response signals to detect a short circuit in the cabling and in the first and second pickoff sensors.

14. The Coriolis flow meter of claim 1 wherein the signal conditioning circuit is further configured to use the first and second response signals to perform an automatic gain adjustment.

15. The Coriolis flow meter of claim 1 wherein the signal conditioning circuit receives one or more reference signals along with the first and second response signals and wherein the signal conditioning circuit is further configured to remove the one or more reference signals.

16. A method for determining a signal difference in cabling and first and second pickoff sensors of a Coriolis flowmeter, comprising:

generating one or more reference signals, wherein the one or more reference signals are substantially identical in phase;

communicating the one or more reference signals into the cabling and the first and second pickoff sensors; and determining the signal difference between first and second response signals returned from the cabling and the first and second pickoff sensors in response to the one or more reference signals.

17. The method of claim 16 wherein the one or more reference signals are substantially identical in phase and in amplitude.

18. The method of claim 16 wherein the signal difference is substantially removed from first and second measurement signals generated by the first and second pickoffs in response to flow conduit vibration.

19. The method of claim 16 further comprising compensating the cabling and the first and second pickoff sensors using the signal difference.

20. The method of claim 16 further comprising periodically compensating the cabling and the first and second pickoff sensors using the signal difference.

21. The method of claim 16 wherein the first and second response signals are different in frequency from first and second measurement signals that are generated by the first and second pickoffs in response to flow conduit vibration.

22. The method of claim 16 wherein the first and second response signals are substantially identical in frequency from first and second measurement signals that are generated by the first and second pickoffs in response to flow conduit vibration.

23. The method of claim 16 wherein the first and second response signals are further used to detect an open circuit in the cabling and in the first and second pickoff sensors.

24. The method of claim 16 wherein the first and second response signals are further used to detect a short circuit in the cabling and in the first and second pickoff sensors.

25. The method of claim 16 wherein the first and second response signals are further used to perform an automatic gain adjustment.

26. The method of claim 16 wherein the signal conditioning circuit receives one or more reference signals along with the first and second response signals and wherein the signal conditioning circuit is further configured to remove the one or more reference signals.

\* \* \* \* \*